United States Patent [19]

Hirano

[11] Patent Number: 4,490,912
[45] Date of Patent: Jan. 1, 1985

[54] PINEAPPLE CUTTER

[76] Inventor: Tsugutoshi Hirano, c/o Kabushiki Kaisha, Hirano Seisakusho Kita-koiwa 3-chome 26-10, Edogawa-ku, Tokyo, Japan

[21] Appl. No.: 501,867

[22] Filed: Jun. 7, 1983

[30] Foreign Application Priority Data

Jun. 8, 1982 [JP] Japan .............................. 57-85227[U]

[51] Int. Cl.³ .......................... A47J 25/00; B26B 3/00
[52] U.S. Cl. ......................................... 30/302; 30/301; 99/543; 99/545
[58] Field of Search ................. 99/505, 515, 538–545, 99/547, 593; 30/113.1, 113.3, 117, 174, 130, 178, 300–302; 83/651.1; 408/195, 200; D7/43, 106

[56] References Cited

U.S. PATENT DOCUMENTS

| 1,466,114 | 8/1923 | Buchi | 30/302 |
| 1,744,422 | 1/1930 | Taylor | 30/302 |
| 3,540,503 | 11/1970 | McNair | 99/544 X |
| 4,246,700 | 1/1981 | Coulon et al. | 99/545 X |

FOREIGN PATENT DOCUMENTS 764717  3/1957  United Kingdom ................. 99/545

Primary Examiner—Timothy F. Simone
Attorney, Agent, or Firm—Fleit, Jacobson, Cohn & Price

[57] ABSTRACT

A pineapple cutter consists of a cylinder, a cutter portion and a pair of handles. In this case, the cylinder is adapted to punch an outer peel and an interior of the pineapple so as to separate both portions. The cutter portion is secured to the outer side of the cylinder and is adapted to cut the outer side peel of pineapple longitudinally. The pair of handles is secured to a supporting plate extends from the cutter portion integrally.

3 Claims, 5 Drawing Figures

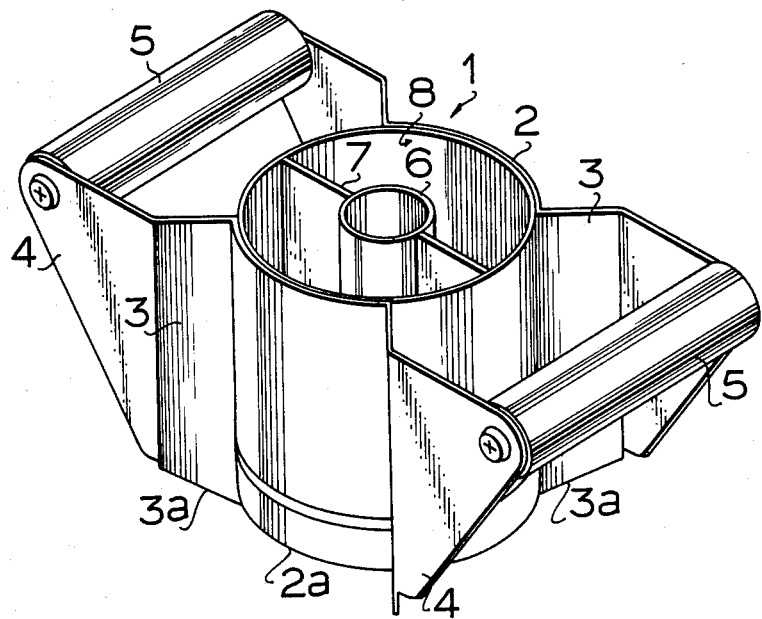
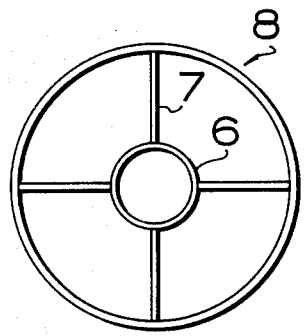
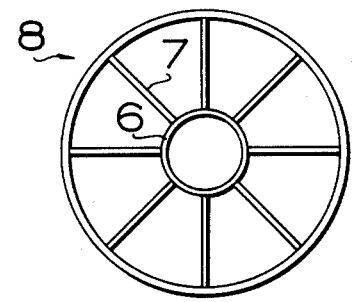

PINEAPPLE CUTTER

BACKGROUND OF THE INVENTION

This invention relates to a pineapple cutter which punches the outer peel of a pineapple and the interior thereof so as to separate easily after cutting upper and lower end portions of said pineapple respectively.

Heretofore, as pineapple cutters, various kinds of shapes are known. However, any of them is a large shape cutter which processes a plenty of pineapples at the same time and is high in cost.

Nevertheless, the conventional pineapple cutter is mainly for business use employed in a processing work, a selling shop and the like and is difficult in practical employment due to the scarcity of wide use because it is heavy in weight, inconvenient in treatment and the like for general domestic use.

This invention is performed, in view of such conditions described above, to provide a handy type pineapple cutter which can be used easily even in a general household.

SUMMARY OF THE INVENTION

A pineapple cutter consists of a cylinder which punches a peel of a pineapple and its interior so as to separate these portions, a cutter portion secured to the cylinder which cuts the outer side peel of the pineapple longitudinally and a pair of handles secured to a supporting plate extends from the cutter portion integrally.

BRIEF DESCRIPTION OF THE DRAWINGS

FIG. 3 is a perspective view of another embodiment of this invention and

FIGS. 4 (A) and (B) are plane view of inner cutters which show various kinds of shapes respectively.

DETAILED DESCRIPTIONS OF THE INVENTION

Figure 1:
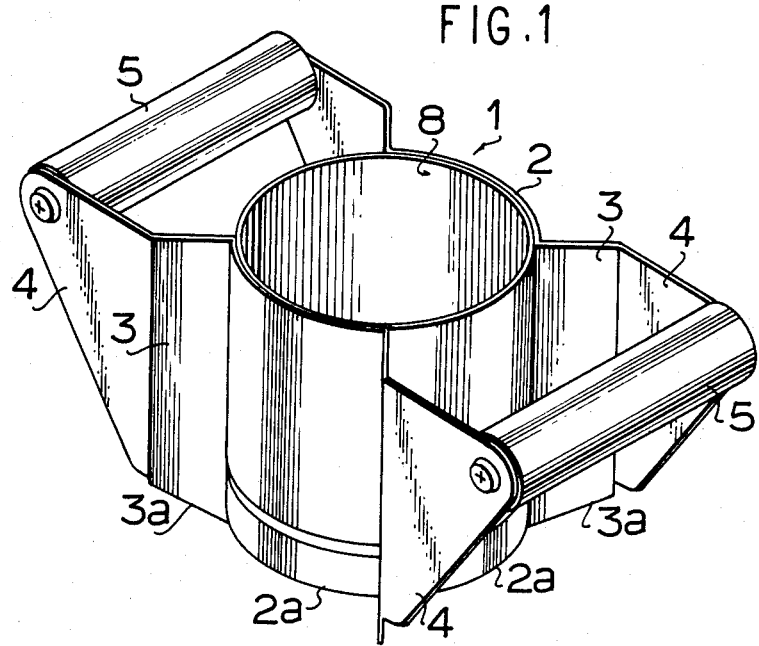
FIG. 1 is a perspective view of a pineapple cutter which shows an embodiment of this invention.

Referring to the drawings of the embodiments in accordance with this invention, the details of the invention will be described as follows.

FIG. 1 is a perspective view of a pineapple cutter 1 of this invention, said pineapple cutter consisting of a cylinder 2 having a fixed diameter designed so as to punch the pineapple separating the peel and the interior of the pineapple with an uniform size, a cutter portion 3 secured to the outer side of said cylinder 2 to cut the outer side peel of the pineapple longitudinally and a pair of handles 5 of left and right secured to a supporting plate 4 extending from the cutter portion 3 integrally.

At the lower top end portion of said cylinder 2 and the lower top end portion of the cutter 3, cutter edges 2a and 3a are formed respectively, said cutter edges being designed to separate the peel and the interior, and punch by pressing down the pineapple cutter 1 from the upper surface of the pineapple wherein the upper and lower ends thereof are cut.

The cutter edge 3a of the cutter portion 3 in said pineapple cutter 1 is allowed to incline slightly as shown in FIG. 1, whereby cutting of the edge into the pineapple is performed not only smoothly, but also punching of said pineapple is made easily cutting the outside peel longitudinally.

Figure 2:
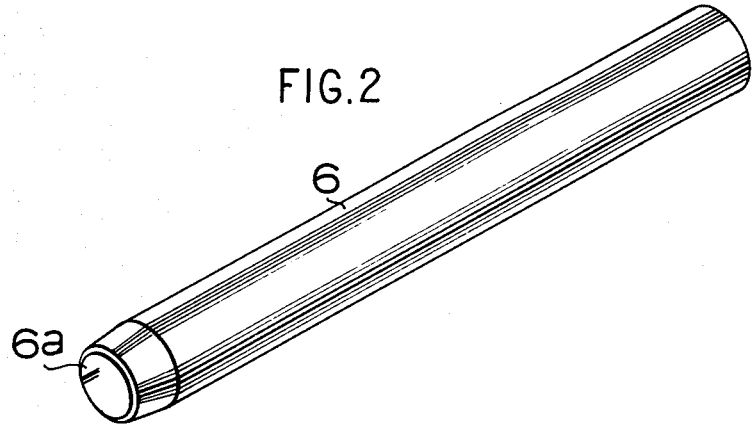
FIG. 2 is a perspective view of a corer of this invention.

FIG. 2 is a perspective view of a corer 6, said corer comprising a hollow cylinder which forms and edge 6a at one end thereof and being used in the case of punching the core portion in the intermediate portion of the interior punched by the pineapple cutter 1.

FIG. 3 is an another embodiment of the pineapple cutter in accordance with this invention wherein an internal cutter 8 which comprises an edge 7 for dividing the punched interior in two equal parts at the time of punching secured to the corer 6 integrally, is incorporated in the cylinder 2.

The said internal cutter 8 may have secured edges 7 not only in a diametrical direction, but also a plurality of edges 7 to the corer 6 radially so as to divide the cylinder into 4 or 8 equal parts as shown in FIGS. 4, (A) and (B). Further, in the above design, the cylinder 2 in pineapple cutter 1 may be provided for several cylinders having small and large diameters other than the standard one so that a cylinder may be used properly according to the size of a pineapple.

Further, the internal cutter which divides the interior into equal parts at the same time of the punching is adapted to attach to the cylinder 2 removably, thereby being capable of punching into 2 to 8 equally divided parts by the proper selection of said cylinder 2. In this case, the internal cutter 8 which performs equal dividing may be provided only at a top end of the cylinder 2 in order to decrease the resistance force.

Accordingly, in the case of punching the pineapple with said pineapple cutter 1 designed above, the peel and the interior of the pineapple are punched by pressing said pineapple from the upper surface grasping a handle 5 of the pineapple cutter 1 after cutting down the upper and lower ends of the pineapple in the horizontal direction previously. In this case, if the inner cutter 8 which performs a fixed equal dividing is secured, said pineapple is cut into several equal parts longitudinally at the same time of punching. Accordingly, in the case of eating, it may be only sliced in a given thickness.

Further, in the case of slicing like a doughnut, after punching the interior and the peel without use of the internal cutter 8, said pineapple may be sliced punching the core with the corer 6.

As described above in details, since the pineapple cutter according to this invention is simple in construction and handy type, it is easy in treatment and applicable not only to a general domestic use, but also a process work and business use in a selling shop sufficiently.

Furthermore, since this cutter is light in weight and the punching resistance is also small, the operation is simple. Thus, if it is used with a desirable internal cutter, the cut to several kinds of shapes is possible and its practical effect is very high.

What I claim is:

1. A pineapple cutter comprising a hollow cylinder including a circumferential portion and a lower end portion, said cylinder having a first cutter edge at the circumferential portion of the lower end portion thereof, a pair of cutter portions each having a second cutter edge secured to, forming a slight inclination to, and extending outwardly from said hollow cylinder to cut the peel of a pineapple longitudinally and a pair of handles secured to supporting plates, said supporting plates secured to, and extending from, said pair of cutter portions and said hollow cylinder.

2. A pineapple cutter according to claim 1, including an internal cutter within said hollow cylinder and having an edge for dividing the punched interior of the pineapple in two equal portions at the same time of punching a core by means of an integral corer.

3. A pineapple cutter according to claim 2, wherein said internal cutter comprises a plurality of cutting edges extending radially from the corer to the hollow cylinder.

* * * * *